United States Patent
Kronenberger

(10) Patent No.: US 10,874,153 B2
(45) Date of Patent: Dec. 29, 2020

(54) ADORNMENT ASSEMBLY FOR AN ARTICLE AND METHOD OF FORMING AN ADORNMENT ASSEMBLY

(71) Applicant: Ronald Kronenberger, Riverwoods, IL (US)

(72) Inventor: Ronald Kronenberger, Riverwoods, IL (US)

( * ) Notice: Subject to any disclaimer, the term of this patent is extended or adjusted under 35 U.S.C. 154(b) by 406 days.

(21) Appl. No.: 15/399,395

(22) Filed: Jan. 5, 2017

(65) Prior Publication Data

US 2017/0143060 A1    May 25, 2017

Related U.S. Application Data

(63) Continuation-in-part of application No. 14/883,954, filed on Oct. 15, 2015, now Pat. No. 10,292,442.
(Continued)

(51) Int. Cl.
*A41D 27/08*    (2006.01)
*A42B 1/24*    (2006.01)
(Continued)

(52) U.S. Cl.
CPC .............. *A41D 27/08* (2013.01); *A42B 1/248* (2013.01); *B32B 3/266* (2013.01); *B32B 3/30* (2013.01);
(Continued)

(58) Field of Classification Search
CPC ............ A41D 27/08–085; A42B 1/004; A42B 1/24–248; B32B 3/14–16;
(Continued)

(56) References Cited

U.S. PATENT DOCUMENTS 2,636,837 A    4/1953    Summers
4,621,441 A *    11/1986    Wagner .................... G09F 3/00
                                                                      36/1
(Continued)

FOREIGN PATENT DOCUMENTS

GB        2107649 A    5/1983

OTHER PUBLICATIONS

Fun Express. "Fun Express 500 Assorted Bug Shape Foam Self-Adhesive Craft Stickers." Amazon. Amazon, 2011. Web. <https://www.amazon.com/Assorted-Shape-Self-Adhesive-Craft-Stickers/dp/B0041INQOO>. (Year: 2011).*
(Continued)

*Primary Examiner* — Laura C Powers
*Assistant Examiner* — Larissa Rowe Emrich
(74) *Attorney, Agent, or Firm* — Wood, Phillips, Katz, Clark & Mortimer

(57) ABSTRACT

An adornment assembly for an article having a base assembly made up of at least one layer, each with a thickness between oppositely facing surfaces. One of the oppositely facing surfaces faces an article surface to which the adornment assembly is secured. The at least one layer defines at least a first receptacle. The adornment assembly further has a plurality of discrete components each with a thickness between oppositely facing surfaces. At least first and second of the discrete components are placed in the at least first receptacle so that one of the oppositely facing surfaces on each of the first and second discrete components is exposed for viewing with the adornment assembly secured to an article.

29 Claims, 11 Drawing Sheets

Related U.S. Application Data which is a continuation-in-part of application No. 14/323,157, filed on Jul. 3, 2014, now Pat. No. 10,568,376.

(51) Int. Cl.

| | |
|---|---|
| *B32B 5/26* | (2006.01) |
| *B32B 7/08* | (2019.01) |
| *B32B 5/06* | (2006.01) |
| *B32B 7/12* | (2006.01) |
| *B32B 9/04* | (2006.01) |
| *B32B 27/06* | (2006.01) |
| *B32B 27/12* | (2006.01) |
| *B32B 3/30* | (2006.01) |
| *B32B 5/02* | (2006.01) |
| *B32B 3/26* | (2006.01) |
| *B32B 9/02* | (2006.01) |
| *B32B 27/08* | (2006.01) |

(52) U.S. Cl.
CPC .............. *B32B 5/022* (2013.01); *B32B 5/024* (2013.01); *B32B 5/026* (2013.01); *B32B 5/06* (2013.01); *B32B 5/26* (2013.01); *B32B 7/08* (2013.01); *B32B 7/12* (2013.01); *B32B 9/025* (2013.01); *B32B 9/04* (2013.01); *B32B 9/045* (2013.01); *B32B 9/047* (2013.01); *B32B 27/06* (2013.01); *B32B 27/08* (2013.01); *B32B 27/12* (2013.01); *B32B 2262/0276* (2013.01); *B32B 2307/31* (2013.01); *B32B 2307/402* (2013.01); *B32B 2307/416* (2013.01); *B32B 2307/546* (2013.01); *B32B 2307/58* (2013.01); *B32B 2437/00* (2013.01); *B32B 2437/04* (2013.01); *B32B 2451/00* (2013.01)

(58) Field of Classification Search
CPC .......... B32B 5/14–145; B32B 1/00–06; B32B 3/06–08; B32B 3/10; B32B 3/26–30; B32B 5/00–147; B32B 38/0004; B32B 38/10–105; B32B 2451/00; B32B 2519/00; B32B 2556/00; B32B 3/16; B32B 3/18; B32B 3/266; B44C 1/10; B44C 1/28; B44C 3/123; B44C 5/005

USPC .................... 428/66.5, 79, 542.2; 2/224, 246
See application file for complete search history.

(56) References Cited

U.S. PATENT DOCUMENTS

| | | | |
|---|---|---|---|
| 5,452,479 A | 9/1995 | Mostert | |
| 5,636,385 A * | 6/1997 | Harrison ................ | A41D 27/08 2/115 |
| 5,960,476 A | 10/1999 | Danzy | |
| 5,996,116 A | 12/1999 | Tate | |
| 6,418,562 B1 | 7/2002 | Shwartz et al. | |
| 7,411,659 B1 * | 8/2008 | Gaetano ................ | G03B 27/58 355/126 |
| 8,387,412 B2 | 3/2013 | O'Byrne | |
| 2003/0186011 A1 * | 10/2003 | Sloot ........................ | B32B 9/00 428/40.1 |
| 2004/0079011 A1 | 4/2004 | Shwartz et al. | |
| 2004/0176005 A1 * | 9/2004 | Nordstrom ............. | A41D 27/08 442/149 |
| 2006/0143790 A1 | 7/2006 | Kronenberger | |
| 2006/0212993 A1 * | 9/2006 | Wang ...................... | A42C 5/00 2/171 |
| 2007/0235125 A1 | 10/2007 | Dealing | |
| 2008/0141567 A1 | 6/2008 | Chen | |
| 2008/0173222 A1 | 7/2008 | Jurnovoy | |
| 2012/0005808 A1 | 1/2012 | Shwartz | |
| 2012/0073737 A1 | 3/2012 | Tsai | |
| 2012/0141698 A1 * | 6/2012 | OLeary .................. | D06P 5/003 428/32.77 |

OTHER PUBLICATIONS

International Search Report and Written Opinion, dated Mar. 8, 2018, in International Patent Application No. PCT/US2018/012493.
International Preliminary Report on Patentability, dated Jul. 9, 2019 in International Application No. PCT/US2018/012493.
Extended European Search Report dated May 13, 2019 in European Patent Application No. EP 15 90 1875.
Supplementary European Search Report, dated Oct. 7, 2020 in European Patent Application No. EP 18 73 6489.

* cited by examiner

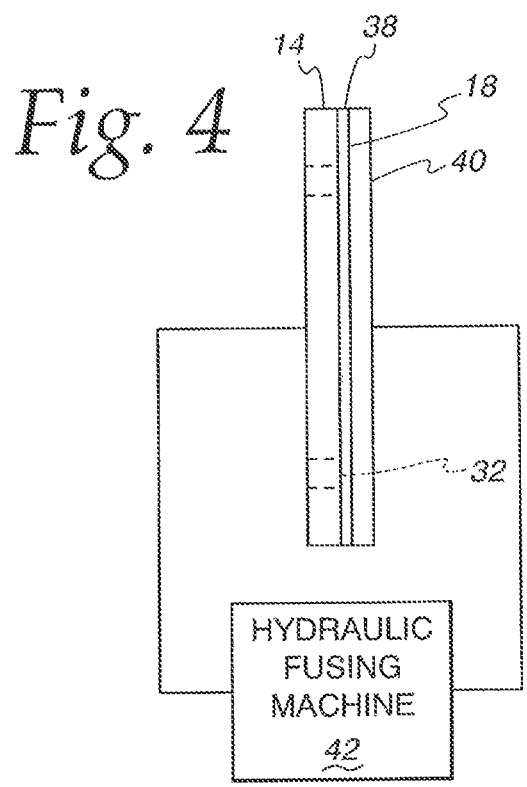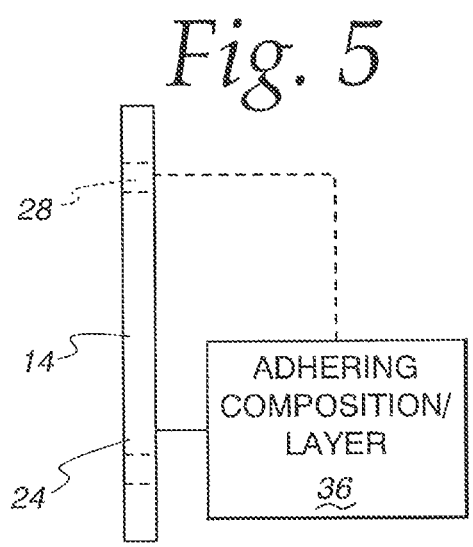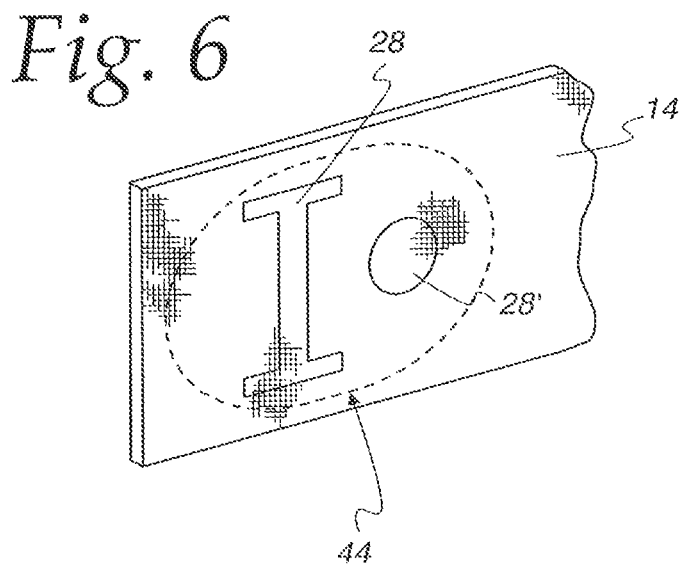

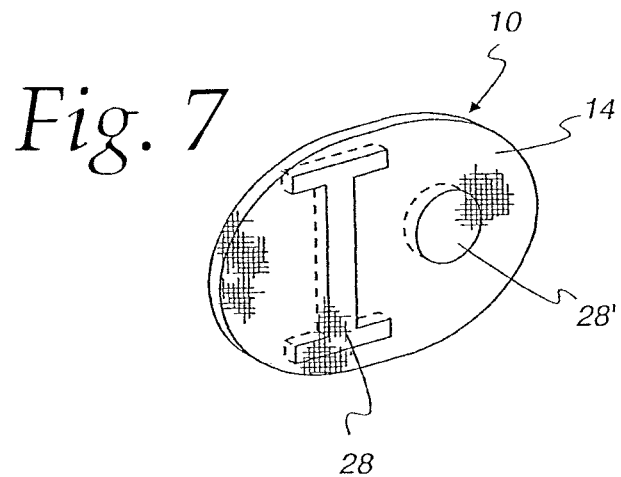
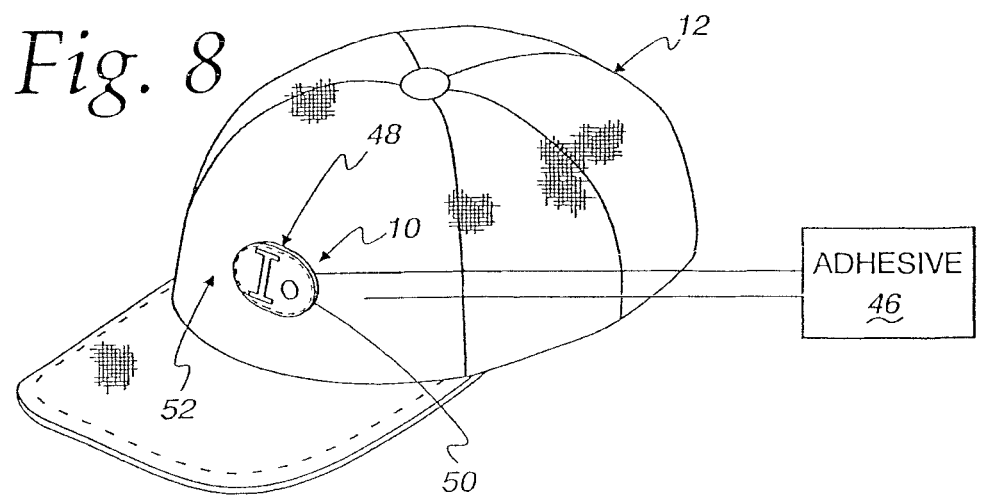
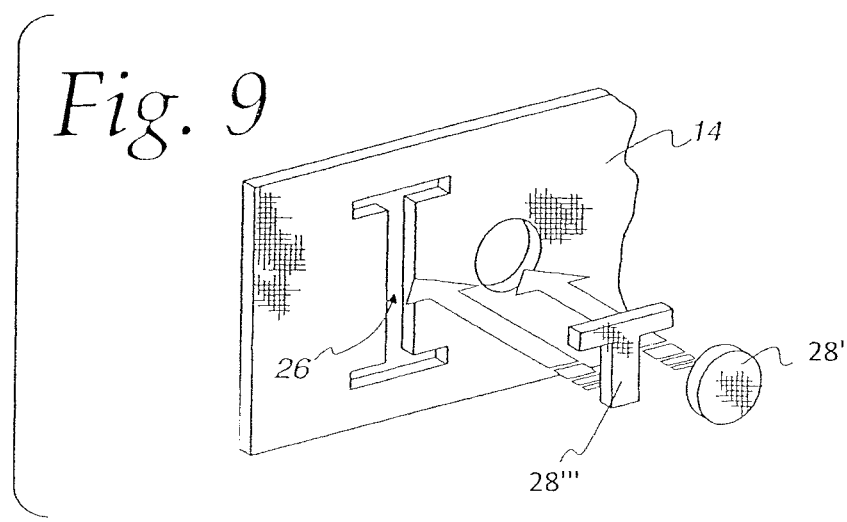

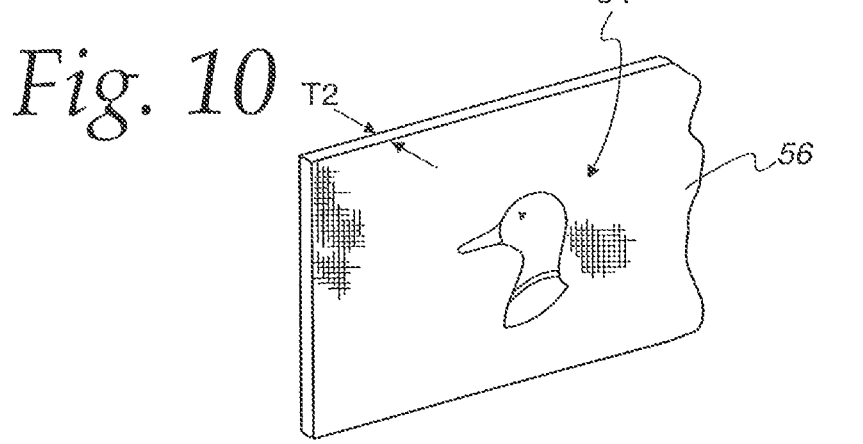
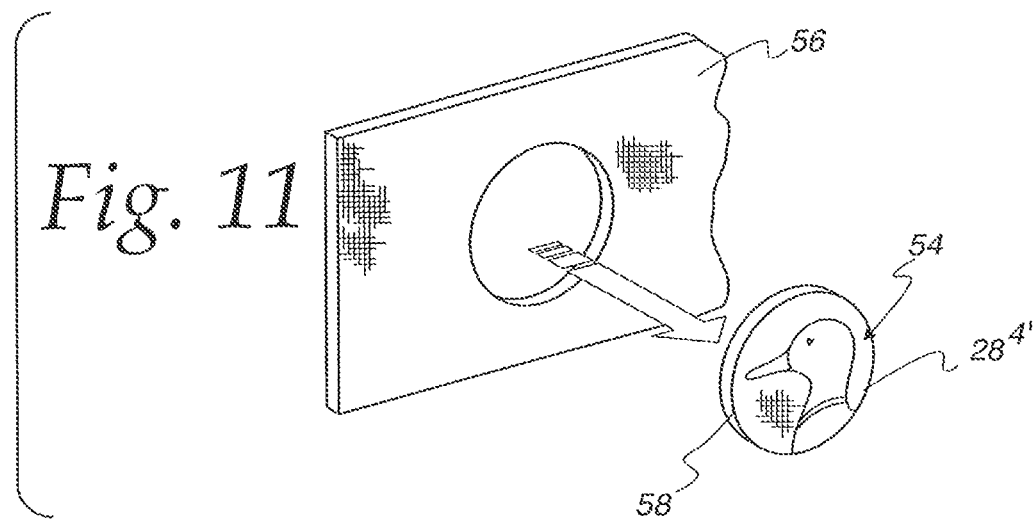
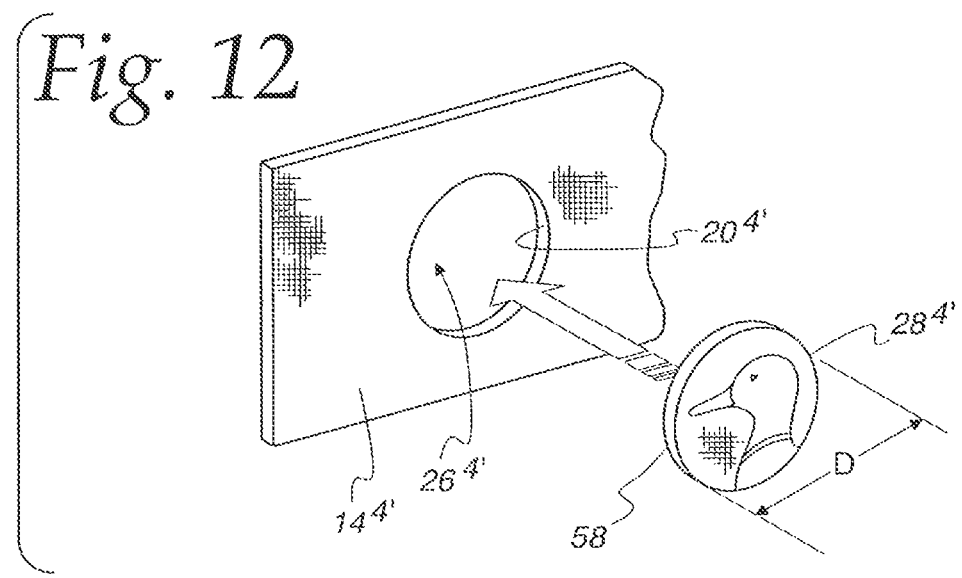

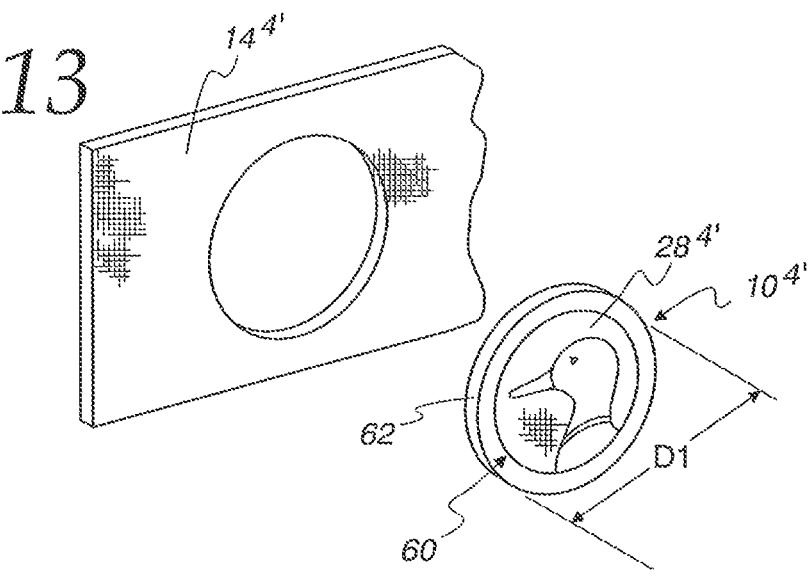
Fig. 13
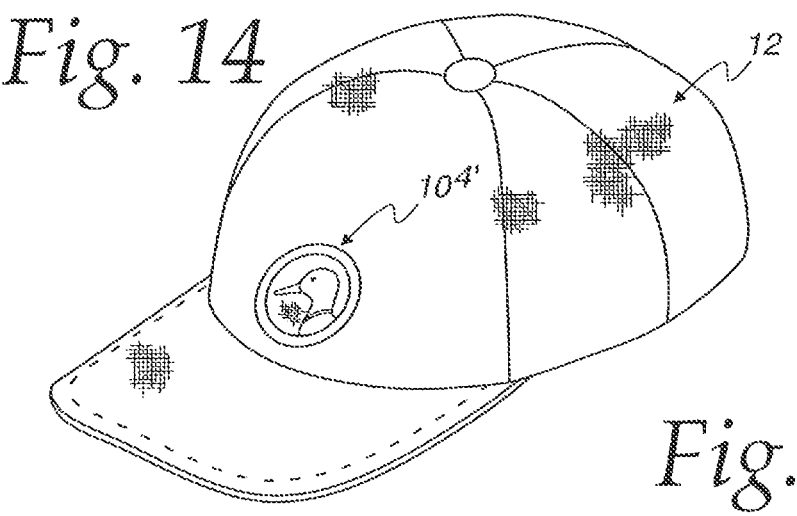
Fig. 14
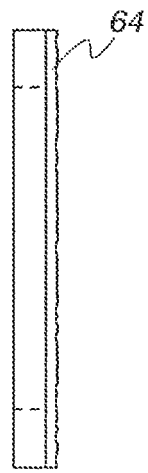
Fig. 15
Fig. 16
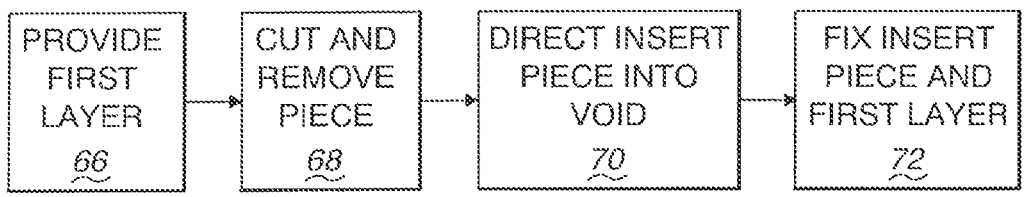

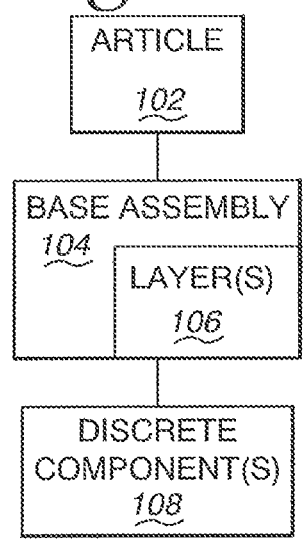
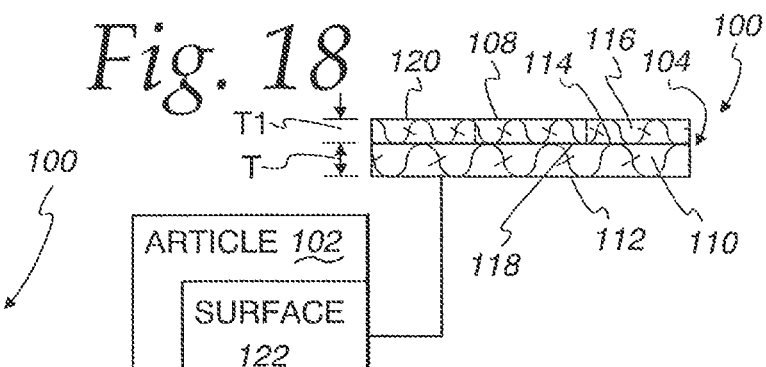
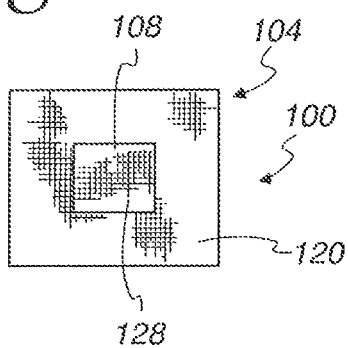
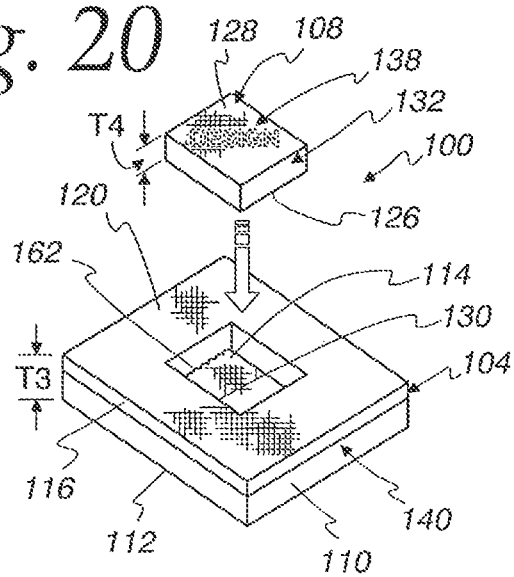

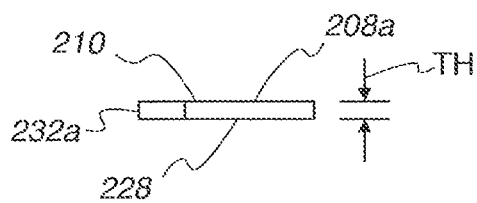
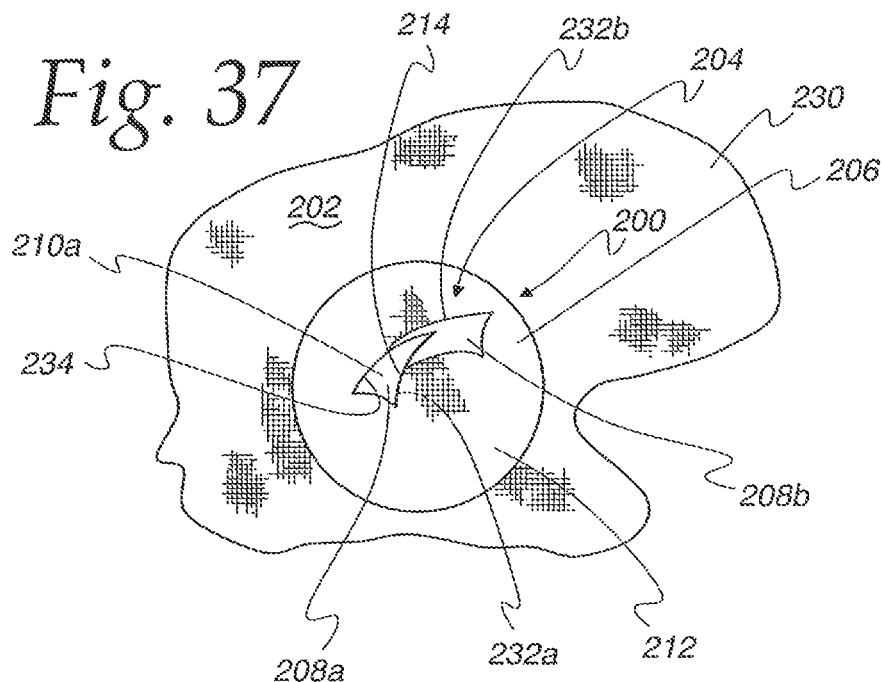
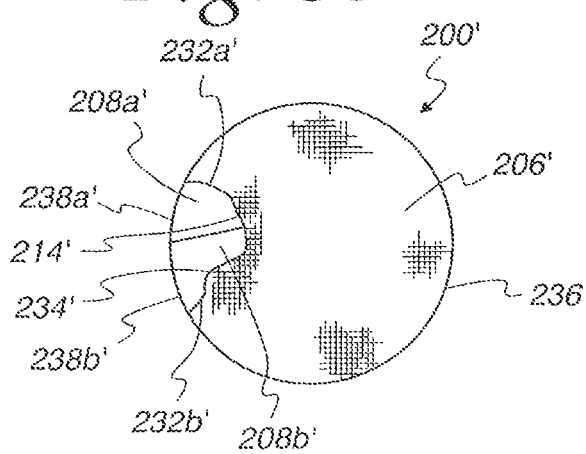
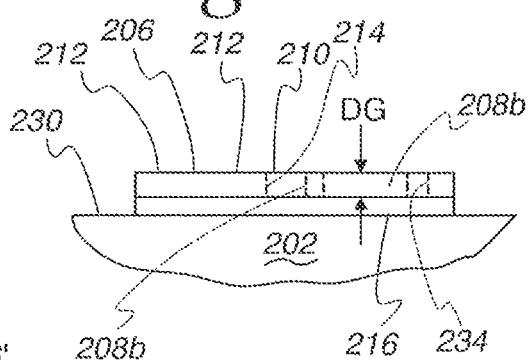

ADORNMENT ASSEMBLY FOR AN ARTICLE AND METHOD OF FORMING AN ADORNMENT ASSEMBLY

CROSS-REFERENCE TO RELATED APPLICATIONS

This application is a continuation-in-part of U.S. patent application Ser. No. 14/883,954, filed Oct. 15, 2015.

BACKGROUND OF THE INVENTION

Field of the Invention

This invention relates to adornment as used on articles, such as apparel articles.

Background Art

The apparel industry, which represents one category of "article" to which the invention herein relates, continues to be one of the most competitive consumer industries worldwide. Appearance is generally one of the most critical selling points for virtually all apparel. As a result, those in the industry have invested, and continue to invest, enormous sums in different ways to adorn apparel to make it more visually appealing than the apparel of their competitors.

Toward this end, one focus has been upon discrete ornamentation/adornment that is provided on virtually all types of apparel. This category includes a wide range of adornment types. The adornment may be in the form of a logo, informational lettering, an eye-catching design, representations of persons, places, and things, etc.

Most commonly, this type of ornamentation is applied at a continuous exposed surface of the article. That surface is normally defined by an outer layer that may be a cloth material, leather, etc.

As one example, ornamentation is commonly formed by embroidering a pattern directly upon an outer layer defining the exposed surface of the article. The embroidery process may utilize threads that contrast with the color and/or texture of the exposed outer layer to produce an obvious contrast to highlight the added material.

Embroidery has some inherent drawbacks. First of all, embroidery equipment involves a significant financial investment. Further, the embroidery process typically produces a flat design. Multiple layers may have to be formed to produce a noticeable 3-dimensional projection on the exposed surface, if that look is desired. Additionally, it is difficult to make a sharp and distinct transition between the embroidered thread and the edge thereof at which the underlying surface is exposed. Instead, a somewhat rough edge is commonly produced which is worsened by thicker threads. Still further, it is difficult to form intricate shapes using a basic embroidery process, particularly when the shapes have a small footprint.

Another problem that arises with embroidery relates to the cutting of substrates to appropriately match an embroidered pattern when the embroidery is applied as part of a process to pre-form a patch for subsequent application. Oftentimes embroidered patterns are applied in varying free form designs. It may be difficult thereafter to set up the cutting equipment to make a desired matching perimeter edge, particularly since embroidered patterns may become random and numerous. Potentially, dies would be required for each variation.

As one example, the substrate is cut first to a particular embroidery pattern to be made. Precise alignment is required to properly match the cut substrate with the embroidery equipment. This can become expensive and lead to rejects and high cost per unit.

Woven/embroidered ornamentation can be formed using fine thread and a process that allows rather intricate, low profile shapes to be precisely formed with sharp transition edges, even with a design having a small areal extent. The weaving process is one that generally involves high end equipment that demands a significant up-front equipment investment. Even with fine thread, it is difficult to produce sharp, crisp transitions between contrasting areas.

Another widely used method of producing ornamentation is to perform a screen printing operation. Once again, it is difficult to form precise shapes using this process. Further, the overall quality of screen printed ornamentation is generally less than that of the counterparts made by embroidery and weaving processes. Additionally, the integrity of the screen printed material depends upon the tenacity of its adherence to the substrate. On cloth, the degree of adherence is difficult to control. Even in a best case situation, over time, the screen printed material is prone to cracking, being rubbed off, and/or fading, which may detract significantly from the overall appearance of the associated article.

Pre-formation of a patch or label commonly is carried out using a variety of techniques other than embroidery. Heretofore, the pre-formed patches have been made with a multitude of different structural variations. Commonly, layers are stacked to highlight visually contrasting materials, designs, and colors. This stacking process creates a number of different problems.

First of all, the stacking of multiple layers produces a stepped appearance which may not be desirable. Multiple stacked layers may also produce a generally thickened patch configuration which may be undesirable.

Further, when components or layers are stacked on underlying layers with different footprints, it is generally difficult to create a neat appearance at the front of the patch. For example, overlying layers may be held in place by stitching. This exposed stitching may be visually unappealing.

It is also generally difficult to maintain perimeter edges of overlying layers in intimate contact with an immediately underlying surface. This condition may worsen as the materials wrinkle, warp, and/or fray.

Still further, this stacked construction tends to create edges that make the patch prone to snagging on foreign objects when the apparel items are used during normal activities. For apparel items that are washed, this snagging problem becomes aggravated as normal washing techniques cause the patch to be dragged against parts of the apparel item with which it is associated and/or other items being washed.

The above issues have generally limited the ability of manufacturers to make certain eye-catching ornamentation.

The industry continues to seek out improved techniques for creating and applying ornamentation to all types of apparel articles, such as headwear, shirts, pants, blouses, accessories, etc. The driving design objectives are typically to produce a visually appealing, high quality, long lasting ornamentation that can be applied at a reasonable price.

SUMMARY OF THE INVENTION

In one form, the invention is directed to an adornment assembly for an article. The adornment assembly includes a base assembly having at least one layer, each with a thickness between oppositely facing surfaces. One of the oppositely facing surfaces on the one layer is configured to face an article surface to which the adornment assembly is secured. The at least one layer defines at least a first receptacle. The adornment assembly further includes a plurality of discrete components each having a thickness between oppositely facing component surfaces. The plurality of discrete components consist of at least first and second discrete components that are placed in the at least first receptacle so that one of the oppositely facing surfaces on each of the first and second discrete components is exposed for viewing with the adornment assembly secured to an article.

In one form, the first and second discrete components each has a peripheral edge. Each of the receptacles has a surrounding edge. The peripheral and surrounding edges abut to maintain a predetermined alignment of the first and second discrete components and the at least first layer.

In one form, with the adornment assembly secured to an article, at least one of the oppositely facing surfaces on at least one of the layers is exposed for viewing together with the one of the oppositely facing surfaces on each of the first and second discrete components.

In one form, the at least one of the oppositely facing surfaces on the at, least one of the layers is substantially flush with the one of the oppositely facing surfaces on the first and second discrete components.

In one form, a full extent of the peripheral edge on the first discrete component is abutted, or in close proximity, to at least one of: a) at least one surrounding edge of at least one of the receptacles; and b) at least one peripheral edge on at least one of the discrete components.

In one form, the at least one of the oppositely facing surfaces on the at least one of the layers is on the one layer.

In one form, the base assembly has a second layer between the one layer and an article with the adornment assembly secured to the article.

In one form, the peripheral edge on the first discrete component has only a portion that is surrounded by one or more of the layers and/or one or more of the discrete components.

In one form, the full extent of the peripheral edge is closely conformingly surrounded by the at least one of the at least one surrounding edge of the at least one of the receptacle and the at least one peripheral edge on the at least one of the discrete components.

In one form, the portion of the peripheral edge on the first discrete component is closely conformingly surrounded by the one or more of the layers and/or the one or more of the discrete components.

In one form, one of the oppositely facing surfaces on the second layer is directly exposed to a surface on an article to which the adornment assembly is secured. The other of the oppositely facing surfaces is directly exposed to the one of the oppositely facing surfaces on the one layer.

In one form, the at least one layer and the plurality of discrete components each is made from a flexible fabric.

In one form, one of the layers is configured to define a masking area through which an underlying component can be viewed.

In one form, the flexible fabric has a woven construction.

In one form, the adornment assembly is provided in combination with an article that is an apparel article.

In one form, the oppositely facing surfaces exposed for viewing on each of the first and second discrete components cooperate to define at least a part of a logo.

In one form, the adornment assembly further includes an adhesive layer that is heated to secure the discrete components to at least one of an article to which the adornment assembly is secured and the base assembly.

In one form, the first receptacle extends one of: a) through a plurality of layers on the base assembly; b) partially through a layer on the base assembly; and c) fully through a single layer on the base assembly.

In one form, the base assembly and first discrete component are configured so that the first discrete component is maintained in a predetermined position with the receptacle.

In one form, the invention is directed to a method of forming the adornment assembly described above. The method includes the steps of: laser cutting a sheet layer to thereby form at least a part of the peripheral edge of the first discrete component; and combining the first discrete component with the second discrete component and the base layer so that at least one of the second discrete component and base layer conforms closely to the part of the peripheral edge of the first discrete component.

In one form, the method further includes the step of forming at least a part of the first receptacle in the base assembly through a laser cutting operation.

In one form, the invention is directed to another method of forming an adornment assembly. The method includes the steps of: obtaining a base assembly having at least one layer, each with a thickness between oppositely facing surfaces, one of the oppositely facing surfaces on the one layer configured to face an article surface to which the adornment assembly is secured, the at least one layer defining at least a first receptacle; laser cutting a sheet layer to thereby form at least a part of a peripheral edge of a discrete component; and securing the discrete component in the receptacle so that the base assembly conforms to the part of the peripheral edge of the discrete component.

In one form, the method further includes the step of laser cutting the base assembly to form an edge around the receptacle that closely conforms to at least a portion of the part of the peripheral edge of the discrete component.

In one form, the discrete component is a fabric that is woven.

In one form, the one layer is a fabric.

In one form, the fabric of the one layer is a woven fabric.

In one form, the step of securing the discrete component consists of securing the discrete component using a heat activated adhesive.

BRIEF DESCRIPTION OF THE DRAWINGS

FIG. 4 is a side elevation view of the layer in FIG. 3 with the insert pieces directed into respective voids and with separate backing layers fixed through an hydraulic fusing machine;

FIG. 5 is a view as in FIG. 4 and showing an alternative structure for fixing the insert pieces in the voids;

FIG. 6 is a view as in FIG. 3 with the insert pieces directed into the voids and with a desired end shape for the adornment assembly outlined in dotted lines;

FIG. 7 is a perspective view of the adornment assembly cut from the first layer;

FIG. 8 is a reduced, perspective view of the adornment assembly in FIG. 7 integrated into an article in the form of a baseball-style cap;

FIG. 9 is a view as in FIG. 2 using a modified form of insert piece that does not fully conform to a void into which it is directed;

FIG. 10 is a perspective view of a layer having a pattern formed thereon to initiate formation of a modified form of adornment assembly, according to the invention;

FIG. 11 is a view as in FIG. 10 wherein the layer has been cut to define an insert piece including the pattern;

FIG. 12 is a perspective view showing the insert piece being directed into a void formed in a layer as in FIG. 2;

FIG. 13 is a view as in FIG. 12 wherein the insert piece is directed into the void and the first layer is cut to produce the adornment assembly;

FIG. 14 is a reduced, perspective view of the adornment assembly integrated into a baseball-style cap;

FIG. 15 is a side elevation view of the adornment assembly with an adhesive layer thereon;

FIG. 16 is a flow diagram representation of a method of adorning an article, according to the invention;

FIG. 17 is a schematic representation of an adornment assembly, according to the present invention, including a base assembly made of multiple layers and having a discrete component incorporated therein, with the base assembly attached to an article;

FIG. 18 is a side elevation view of one specific form of the adornment assembly of FIG. 17;

FIG. 19 is a front elevation view of the adornment assembly in FIG. 18;

FIG. 20 is an exploded perspective view of the adornment assembly in FIGS. 18 and 19;

FIG. 21 is a schematic representation of structure for securing the base assembly to a surface on an article;

FIG. 22 is a schematic representation of structure for securing the discrete component on the base assembly;

FIG. 36 is a side elevation view of the discrete component formed in FIG. 35;

FIG. 37 is a front elevation view of one form of adornment assembly, as shown schematically in FIGS. 33 and 34, and incorporating the discrete component in FIG. 35 and an additional discrete component;

FIG. 38 is a side elevation view of the adornment assembly in FIG. 37;

FIG. 39 is a front elevation view of a further modified form of adornment assembly, as shown schematically in FIGS. 33 and 34;

DETAILED DESCRIPTION OF THE PREFERRED EMBODIMENT

Figure 1:
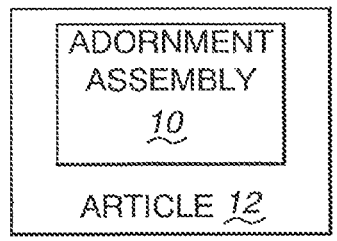
FIG. 1 is a schematic representation of an adornment assembly, according to the present invention, integrated into an article.

Referring to FIG. 1, an adornment assembly, according to the present invention, is shown in schematic form at 10 as integrated into an article 12 to adorn that article. The adornment assembly 10 and article 12 are shown in schematic form to encompass virtually a limitless number of different variations of each. The article 12, into which the adornment assembly 10 is integrated, may be virtually any type of article, but is preferably an article fitting in the category of "apparel". As one specific example, the adornment assembly 10 will be described below as integrated into a headwear piece, and specifically a baseball-style cap.

The adornment assembly 10 may also take virtually a limitless number of different forms. The adornment may be in the form of a logo, informational lettering, eye-catching designs, representations of persons, places, and things, etc. The invention contemplates virtually any type of addition made to the article 12 that serves an ornamental, aesthetic, or informational purpose.

To describe the invention, an exemplary design consisting of the letter "I" and a circular "dot" are shown formed in an adornment assembly in FIGS. 2-8. As noted above, the nature of the design itself is not critical to the present invention.

A first layer 14 is used to form the adornment assembly 10, which is shown in completed form in FIGS. 7 and 8. The first layer 14 has a thickness T between first and second oppositely facing surfaces 16, 18, respectively. The first layer 14 may be a continuous supply of material or a discrete quantity thereof.

Figure 2:
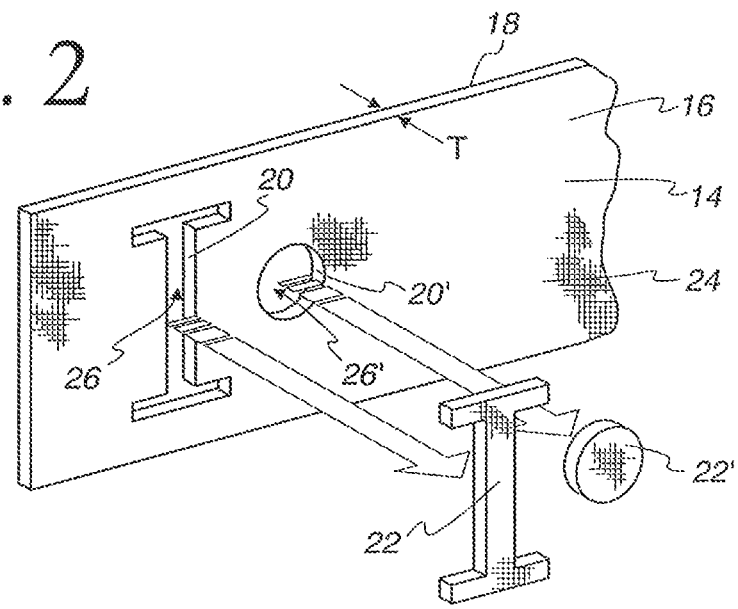
FIG. 2 is an exploded, perspective view showing a layer from which discrete pieces have been cut and separated to initiate the formation of one specific form of the inventive adornment assembly.

Using well-known technology, the first layer 14 is cut fully between the first and second surfaces 16, 18 along first border edges 20, 20' that surround discrete pieces 22, 22' of the first layer 14. As shown in FIG. 2, the discrete pieces 22, 22' are separated from a remaining portion 24 of the first layer 14 to thereby produce spaced voids 26, 26' within the first border edges 20, 20'.

Figure 3:
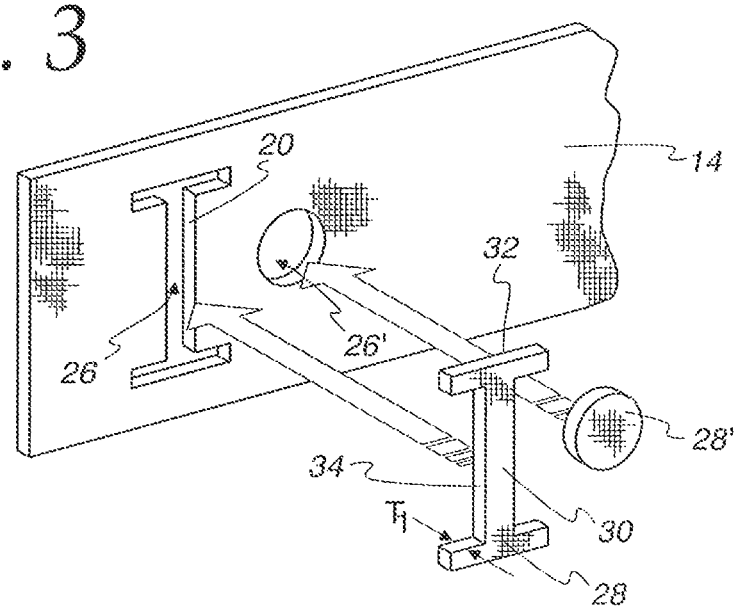
FIG. 3 is a view as in FIG. 2 wherein pre-formed insert pieces are being directed towards voids formed by the removed discrete pieces in FIG. 2.

As shown in FIG. 3, pre-formed insert pieces 28, 28' are provided that are configured to fit within the voids 26, 26', respectively. Exemplary insert piece 28 has a thickness T1 between third and fourth surfaces 30, 32, respectively, and a second border edge 34 having a shape that conforms to the shape of at least a portion of the first border edge 20. In this embodiment, the second border edge 34 conforms in shape to the first border edge 20 along its entire extent.

As shown at FIG. 3, the insert pieces 28, 28' are pressed into their respective voids 26, 26' with the insert pieces 28, 28' initially pre-aligned so that the exemplary second border edge 34 is placed against, or immediately adjacent to, the first border edge 20 along the portions of the first and second border edges 20, 34 where the first and second border edges 20, 34 conform in shape. In this embodiment, there is shape conformance along the full extent of each border edge 20, 34.

The insert pieces 28, 28' are then appropriately fixed to the remaining portion 24 of the first layer 14 by any of a number of different suitable means. It is possible that the insert pieces 28, 28' can be dimensioned relative to the dimensions of the voids 26, 26' so that the insert pieces 28, 28' are adequately held through frictional forces alone. The nature of the material making up the first layer 14 and insert pieces 28, 28', and the size of the insert pieces 28, 28' may contribute to making this possible.

Alternatively, as disclosed schematically in FIG. 5, an adhering composition/layer 36 may be used to fix the exemplary insert piece 28 to the remaining portion 24 of the first layer 14. The adhering composition 36 may be applied to act between the border edges 20, 34 and/or at the second and fourth surfaces 18, 32.

Alternatively, as shown in FIG. 4, one or more backing layers 38, 40 may be applied at the second and fourth surfaces 18, 32. The first backing layer 38 may incorporate an adhesive. Preferably, the backing layer 38 is in the form of a double-sided fusible material. The backing layer 40 may be fixed against the first backing layer 38. In one form, an hydraulic fusing machine 42 may be used to fix the layers 38, 40 through a conventional fusion process.

Once the insert pieces 28, 28' are fixed, the adornment assembly 10 is effectively completed. The first layer 14 may initially be in a starting shape that represents the overall, end, desired configuration for the adornment assembly 10, as shown in FIGS. 7 and 8. Alternatively, the final desired shape may be cut from the first layer, as along the dotted line at 44 in FIG. 6, to allow cutting through the thickness of the first layer 14 to separate the adornment assembly 10, as shown in FIGS. 7 and 8.

As shown in FIG. 8, the adornment assembly 10 can be applied to an article 12, in this case shown as an exemplary headwear piece in the form of a baseball-style cap. The adornment assembly 10 is integrated into the article 12 preferably by use of at least one of an adhesive 46, and a line of stitching 48 that may extend partially or fully around, and slightly within, the perimeter edge 50 of the adornment assembly 10.

The insert pieces 28, 28' and remaining portion 24 of the first layer 14 may be fixed together as an incident of integrating the adornment assembly 10 into the article 12. For example, adhesive 46 applied to an exposed surface 52 of the article 12 may secure the first layer 14 and the insert pieces 28, 28' to the article 12 without requiring a separate fixing step.

The thicknesses T, T1, respectively of the first layer 14 and insert piece 28, may be the same or different. In one preferred form, the thicknesses T, T1 are the same so that the first and third surfaces 16, 30 are flush with the insert piece 28 pressed into the void 26. Alternatively, by making the thicknesses T, T1 different, the insert piece 28 can be either recessed within the void 26 or project slightly therefrom.

The first and third surfaces are preferably such as to be visually contrasting so that the insert pieces 28, 28' can be clearly discerned against the first layer 14. Preferably, this contrast is provided at the border edges 20, 34 for the exemplary insert piece 28. It is thus possible to make a sharp and distinct transition where the border edges 20, 34 meet or are in closely adjacent relationship.

The contrast does not have to be over the entire areal extent of the insert pieces 26, 26' at the first and third surfaces 18, 30. The contrast may be by reason of a difference in color, texture, or any other property that produces a visual contrast between the surfaces 16, 30.

While in one preferred form, each of the insert pieces 28, 28' closely conforms in shape around its outside perimeter edge to the inside perimeter edge bounding the respective void 26, 26', the invention contemplates a lesser conforming relationship. For example, in FIG. 9, the insert piece 28''', corresponding to the insert piece 28, fills only a portion of the void 26. The unfilled portion of the void 26 may provide a contrast by reason of the viewing therethrough of the exposed surface 52 of the article 12 upon which the adornment assembly 10 is applied.

In an alternative form, as shown in FIGS. 10-16, a pattern at 54 may be provided on a layer 56 with a thickness T2. In this embodiment, the pattern 54 is shown in the form of a duck's head, which is only exemplary in nature. The pattern 54 may be any shape or form that is provided for aesthetic and/or informational purposes. The pattern 54 may be applied to the layer 56 by any conventional means, including embroidery, weaving, screen printing, etc.

After forming the pattern 54 on the layer 56, an insert piece $28^{4'}$ is produced by cutting through the thickness T2 of the layer 56 to separate the insert piece $28^{4'}$ fully therefrom. The insert piece $28^{4'}$ has a resulting perimeter border edge 58 that extends fully around the pattern 54.

As shown in FIG. 12, the insert piece $28^{4'}$ is then directed into a void $26^{4'}$ in corresponding first layer $14^{4'}$ that is cut out with a border edge $20^{4'}$ matching the perimeter edge 58 at least partially, and more preferably fully, around its running extent. In this embodiment, the insert piece $28^{4'}$ has a circular shape with a diameter D. The circular shape is not a requirement.

As seen in FIG. 13, once the insert piece $28^{4'}$ is pressed into the void $26^{4'}$, the first layer $14^{4'}$ can be in turn cut in a circular shape with a dimension D1 that is greater than the dimension D, thereby producing an adornment assembly $10^{4'}$ with a contrasting border region 60 in the form of a frame that fully surrounds the insert piece $28^{4'}$. It is not necessary that the circular shapes of the insert piece $28^{4'}$ and perimeter outer edge 62 formed by cutting the layer $14^{4'}$ be concentric. In the embodiment shown, that is the case.

The resulting adornment assembly $10^{4'}$ is then integrated into the article 12, shown in FIGS. 14 and 15, as through the use of an adhesive layer 64 and/or through stitching, as shown in FIG. 8 for the adornment assembly 10.

In one preferred form, the first layer 14, $14^{4'}$ is made from a felt material, which may also be used to form the various insert pieces 28, 28', 28$^{4'}$. Felt lends itself to precision cutting so that a crisp edge is defined that can be matched closely to an adjacent abutting edge. The precision can be such that the insert pieces 28, 28', 28$^{4'}$ are not discernible as elements separate from the first layers 14, 14$^{4'}$. At the same time, the felt material has resiliency which allows close press fitting of the insert pieces 28, 28', 28$^{4'}$ within their respective complementarily-shaped voids 26, 26', 26$^{4'}$. However, virtually any type of material might be utilized with the materials making up the first layer 14, 14$^{4'}$ and insert pieces 28, 28', 28$^{4'}$ being either the same or different.

As one possible variable, the pattern 54 may be formed as a separate woven layer or woven on the layer 56 with a construction wherein the thickness T2 of the layer 56 is less than the thickness of the first layer 14$^{4'}$. Embroidering using a thin thread is another alternative and permits relatively intricate patterns to be formed. A backing layer, such as the backing layers 38, 40, or another type of backing layer, may be applied to the back of the insert piece 28$^{4'}$, with or without the border region 60, to build the thickness of the insert piece 28$^{4'}$ up to that of the first layer 28$^{4'}$ may be flush with the front of the first layer 14$^{4'}$. A protruding or recessed arrangement is also contemplated for the insert piece 28$^{4'}$, with or without the border region 60.

With the structures described above, a method of adorning an article can be carried out as shown in block diagram form in FIG. 16.

As shown at block 66, a first layer is provided having first and second surfaces.

As shown at block 68, the first layer is cut fully between the first and second surfaces along a first border edge that surrounds a discrete piece of the first layer. The discrete piece of the first layer is separated from a remaining portion of the first layer to produce a void within the first border edge.

As shown at block 70, a pre-formed insert piece is provided that is configured to fit within the void. The insert piece has a thickness between third and fourth surfaces and a second border edge having a shape that conforms to a shape of at least a portion of the first border edge.

As shown at block 70, the insert piece is directed into the void with the void and insert piece pre-aligned so that the second border edge is placed against, or immediately adjacent to, the first border edge along portions of the first and second border edges where the first and second border edge shapes conform.

As shown at block 72, with the insert piece directed into the void, the insert piece and remaining portion of the first layer are fixed together to define the adornment assembly.

In carrying out one form of the invention, the parts of the adornment assembly may be cut by a programmable blade cutting machine where the pattern to be struck can be aligned while the outer perimeter of the substrate is being cut. Simultaneous alignment and cutting can occur to avoid the existing problems, particularly associated with free form embroidery.

Another form of the invention is shown in schematic form in FIG. 17. In FIG. 17, an adornment assembly is shown at 100 for application to an article 102, that may be virtually any type of article to which adornment is applied. As with the structure described above, the article may be in the category "apparel", which is used throughout for exemplary purposes only. The adornment assembly 100 may be used on any type of article on which discrete adornment is commonly applied.

The adornment assembly 100 consists of a base assembly 104 made up of a plurality of layers 106 including at least first and second layers. Any number of layers is contemplated—including three or more. The layers 106 collectively cause the base assembly 104 to have a combined thickness between a surface on one of the layers 106, facing and applied to the article 102, and an oppositely facing surface on one of the layers 106 that is exposed for viewing. At least one discrete component 108 is applied to the base assembly 104 so that a surface on the at least one discrete component 108 is exposed for viewing together with the exposed surface on the base assembly 104. The at least one discrete component 108 is applied to the base assembly 104 so that at least a part of the thickness of the discrete component 108 resides within the combined thickness of the base assembly 104.

The schematic showing in FIG. 17 is intended to encompass the specific forms described hereinbelow, as well as virtually an unlimited number of variations of the components therein and their particular combinations. Specific exemplary forms of the adornment assembly 100 will now be described.

In FIGS. 18-20, the adornment assembly 100 has a base assembly at 104 made up of: a) a first layer 110 with a thickness T between oppositely facing first and second surfaces 112, 114, respectively; and b) a second layer 116 with a thickness T1 between oppositely facing third and fourth surfaces 118, 120, respectively. The first and second layers 112, 116 are in stacked relationship so that they together define a combined thickness T3 between the first surface 112 and the oppositely facing fourth surface 120, that remains exposed to viewing with the first surface 112 applied to an exposed surface 122 on the article 102.

As shown schematically in FIG. 21, the base assembly 104 is secured to the article surface 122 through any suitable securing structure 124 well-known to those skilled in the art. The securing structure 124 may be in the form of stitching, an adhesive, with or without heat sealing, etc.

The discrete component 108 is applied to the base assembly 104 and has oppositely facing surfaces 126, 128. The discrete component 108 has a thickness T4 between the oppositely facing component surfaces 126, 128.

The second layer 116 is cut out, or otherwise formed, to define a receptacle 130 that is preferably at least nominally, and potentially closely, matched to the shape of a perimeter edge 132 of the discrete component 108. The discrete component 108 is pressed into the receptacle 130 so that the surface 126 abuts a surface bounding the bottom of the receptacle 130. In this case, the receptacle 130 is formed fully through the thickness T1 so that the receptacle 130 is bounded by the second surface 114 on the first layer 110.

As shown at FIG. 22, the discrete component 108 is secured to the base assembly 104 using securing structure 136 that may take any form known to those skilled in the art. For example, the securing structure 136 may be thread, an adhesive with or without heat sealing, a combination thereof, etc.

As depicted, the discrete component 108 has a thickness T4 that is approximately equal to the thickness T1 of the second layer 116. The thickness T4 may be greater or less than the thickness T1, in which case the surface 128 is respectively above, and recessed below, the fourth surface 120.

The layers 110, 116 may be made from virtually any type of material. In one preferred form, the first layer 110 is made from felt, suede, nonwoven material, etc. This category of material can be positively secured to article surfaces, as through adhesives, and provides a solid foundation for one or more additional overlying layers—in this case, the second layer 116. At the same time, it lends itself to being cut precisely to desired shapes and is not prone to fraying or shredding, as might compromise its integrity or appearance. Further, felt, and the like, heat seals effectively to facilitate adhesive bonding of components thereto.

The second layer 116 may be made from the same material as the first layer 110 but is more preferably a thinner sheet of fabric that is made from polyester and/or natural yarns and/or threads that are woven and/or knitted. The fourth surface 120 will be viewable together with any design, shown generically at 138 in FIG. 20, on the surface 128 of the discrete component 108. The design 138 may be anything commonly used to adorn articles, such as logos, words, pictures, etc., or may be as simple as a solid color or fabric pattern. It has been found that dramatic effects can be realized by using what is commonly referred to as "reflection technology fabrics" for the second layer 116, and potentially for part, or all, of the discrete component 108, such as those utilizing sheen, glitter, shimmer, sparkling reflection, etc. on polyester fabric face up.

The discrete component 108 may have any construction ranging from a solid design to constructions capable of producing intricate designs, such as weaving. Virtually any other type of structure capable of producing a visible design 138 is contemplated. As examples, the design 138 may be generated by at least one of weaving, dyeing, screen printing, embroidery, etc. The invention contemplates any method, apart from those specifically identified, capable of producing the design 138 that may have contrasting textures and/or colors, or solid colors. The discrete component 108 is shown in a pre-formed configuration but could be formed in situ.

The appearance of the first and second layers 110, 116 is preferably coordinated at the peripheral edge 140 of the base assembly 104. By matching color and/or texture, the peripheral edge 140 can appear as a single thickness. Alternatively, a contrasting appearance may be desired.

Figure 23:
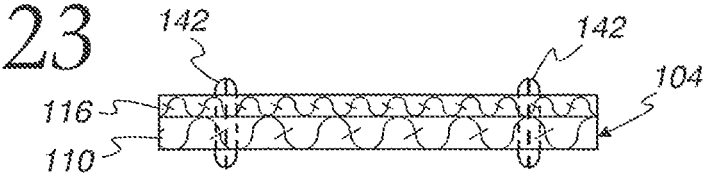
FIG. 23 is a view as in FIG. 18 and showing the adornment assembly pre-formed with layers held together by stitching.
Figure 24:
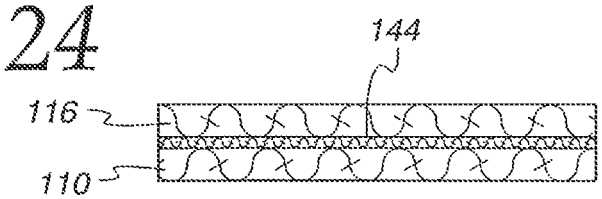
FIG. 24 is a view as in FIG. 23 with the layers held together by an adhesive.

As shown in FIG. 23, the layers 110, 116 may be joined through stitching 142 to pre-form the base assembly 104 into a patch/label before application to the article 102. Alternatively, an adhesive layer 144, as shown in FIG. 24, can be used to join the layers 110, 116 to thereby pre-form the base assembly.

Figure 25:
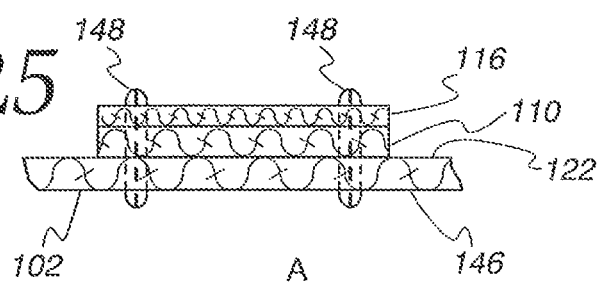
FIG. 25 is a view as in FIGS. 23 and 24 with the adornment assembly formed while being stitched to an article.

In an alternative construction, shown in FIG. 25, the layers 110, 116 may be joined and secured against a surface 122 formed on a layer 146 on the article 102 simultaneously, as by the use of stitching 148. Adhesive alone and/or stitching might be utilized to make this simultaneous securement.

The perimeter shapes of the layers 110, 116, described to this point, are matched. However, this is not required. As shown for the adornment assembly 100' in FIG. 26, the corresponding fourth surface 120' is configured so that the corresponding second surface 114' is exposed for viewing fully therearound. As depicted, the perimeter shapes of the layers 110', 116' are different. The same is true with respect to the discrete component 108', which can have any shape that may be the same as, or different than, the shape of one or both of the layers 110', 116'.

Figure 26:
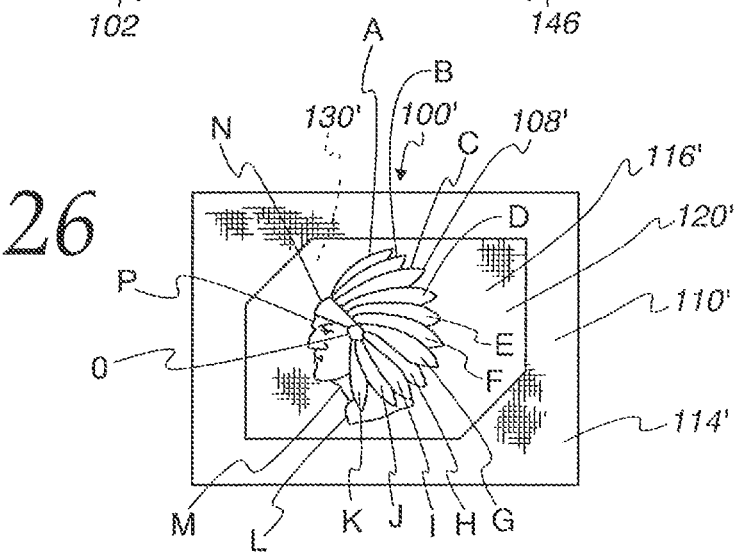
FIG. 26 is a front elevation view of a modified form of adornment assembly according to the invention.

As depicted in FIG. 26, the discrete component 108' is in the shape of the head of a Native American with traditional headdress. The second layer 116' may be laid facially against the first layer 110' so that the thicknesses of the layers 110', 116' are stacked. Alternatively, the first layer 110' may be cut out to produce a receptacle 130' for a part of the thickness, or the full thickness, of the second layer 116', the latter being possible if the thickness of the layer 116' is less than or equal to the thickness of the layer 110'. The receptacle depth may be such that the fourth surface 120' projects above the second surface 114' or is recessed therebelow. A fully surrounding "frame" look is produced by the surface 114'.

Figure 27:
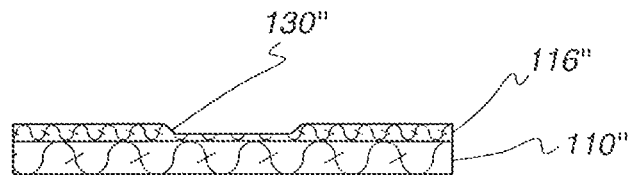
FIG. 27 is a cross-sectional view of a further modified form of adornment assembly according to the invention.

In FIG. 27 a further variation is shown wherein a receptacle 130" is formed in a corresponding second layer 116" overlying a corresponding first layer 110". In this embodiment, the receptacle 130" has a depth that extends only partially through the thickness of the second layer 116". The second layer 116" may be cut out or compressed to produce the receptacle 130".

Figure 28:
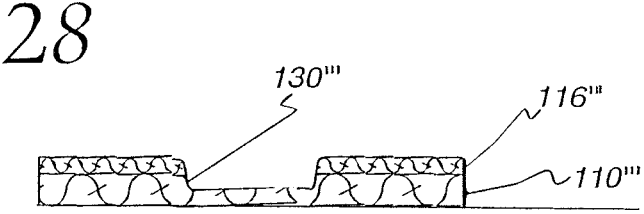
FIG. 28 is a cross-sectional view of a further modified form of adornment assembly according to the invention.

In FIG. 28, a variation is shown wherein the receptacle 130'" is formed fully through the second layer 116'" and partially through the first layer 110'".

Figure 29:
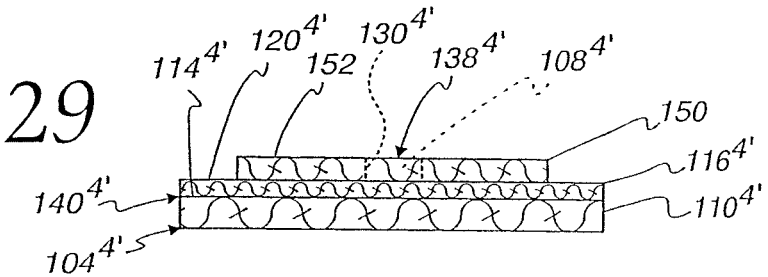
FIG. 29 is a side elevation view of a further modified form of adornment assembly, according to the invention, and including an additional layer.

In FIG. 29, a further modification is shown wherein a third layer 150 is stacked upon corresponding first and second layers $110^{4'}$, $116^{4'}$ to produce a base assembly $104^{4'}$. In one preferred construction, the second and third layers $116^4$, 150 are made from the same category of material, such as the aforementioned "reflection technology fabrics". A discrete component $108^{4'}$ is incorporated into the third layer 150. With this construction, the discrete component $108^{4'}$ might be set into a receptacle $130^{4'}$ in the corresponding base assembly $104^{4'}$ that extends fully through the thickness of the third layer 150 or partially therethrough. Alternatively, in the former case, the receptacle might extend partially or fully through the thickness of the second layer $116^{4'}$ and, in the latter case, potentially partially through the thickness of the first layer $110^{4'}$.

The base assembly $104^{4'}$ is constructed with many potentially different appearances. The perimeter shapes and sizes of the layers $110^{4'}$, $116^{4'}$, 150 may be the same. In that case, the multiple layer construction primarily provides a way to vary the appearance of the peripheral edge $140^{4'}$ of the base assembly $104^{4'}$. By changing shape and size, different portions of a surface 152 on the third layer 150 and surfaces $114^{4'}$ on the layer $110^{4'}$ and $120^{4'}$ on the layer $116^{4'}$ can be selectively exposed for simultaneous viewing in conjunction with the design $138^{4'}$ on the discrete component $108^{4'}$. A single fully surrounding frame look, or a frame inside of a frame look, may be produced by controlling the footprints of the various layers.

Recessing of the layer 150 into the layer $116^{4'}$ and/or the layer $116^{4'}$ into the layer $110^{4'}$ are also contemplated. All of these variations can be coordinated with the design $138^{4'}$ on the discrete component $108^{4'}$.

Figure 30:
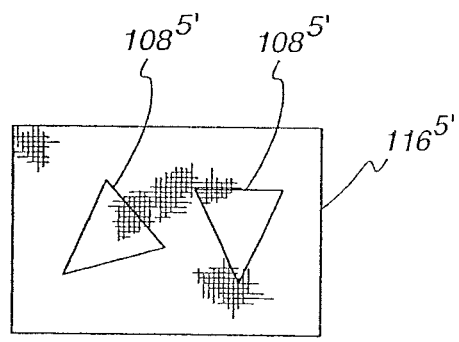
FIG. 30 is a front elevation view of a further modified form of adornment assembly according to the invention.

In a further variation as shown in FIG. 30, the uppermost layer, which in the two-layer configuration corresponds to the second layer as identified in FIG. 30 as $116^{5'}$, may be formed with receptacles to accommodate multiple discrete components $108^{5'}$.

Figure 31:
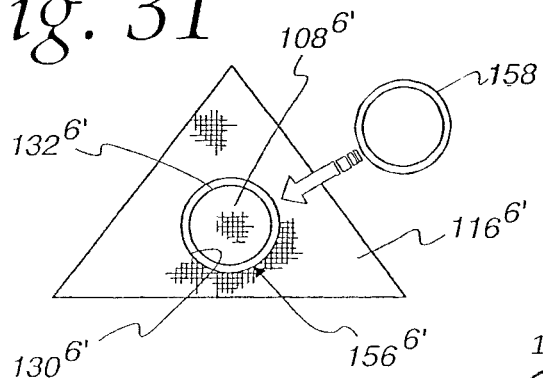
FIG. 31 is an exploded, front elevation view of a further modified form of adornment assembly, according to the present invention, and including a border bead.

In another variation, as shown in FIG. 31, a second layer $116^{6'}$ has a receptacle $130^{6'}$ for a discrete component $108^{6'}$ bounded by an edge that is larger than the facing perimeter edge $132^{6'}$ for the discrete component $108^{6'}$. This leaves a peripheral gap 156. A border bead 158 is formed to be placed in, and fill, the gap 156. The border bead 158 may be suitably secured, as by an adhesive, with a flush, projecting, or recessed construction.

Figure 32:
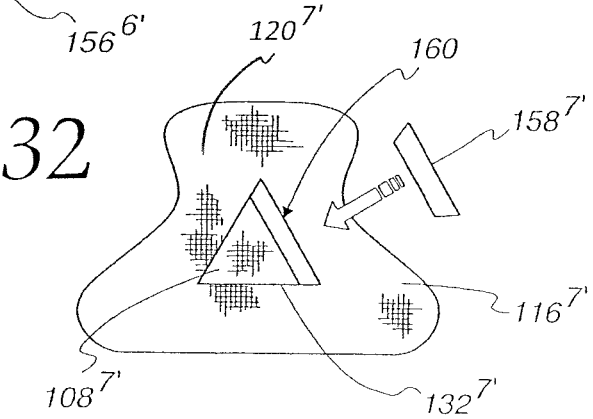
FIG. 32 is a view as in FIG. 31 of a further modified form of adornment assembly, according to the invention, and utilizing a different configuration of border bead.

As shown in FIG. 32, a second layer $116^7$ may have a gap 160 that extends only partially around the peripheral edge $132^7$ of the discrete component $108^7$. A suitably shaped border bead $158^7$ is secured in the gap 160. The border bead $158^{7'}$ may be flush with, project above, or be recessed below, the surface $120^{7'}$.

The use of the border beads 158, $158^{7'}$ adds another tool for design variation.

The peripheral gaps 156⁶', 160 provide a location whereat stitching can be formed to join layers or an entire base assembly to the article 102. This location allows for the stitching to be hidden and ultimately covered by the border bead 158, 158⁷'.

As seen in FIG. 20, the receptacle 130 also provides a location for hidden stitching identified at 162. After the stitching 162 is formed, the discrete component 108 will hide the same once directed into the receptacle 130.

Figure 33:
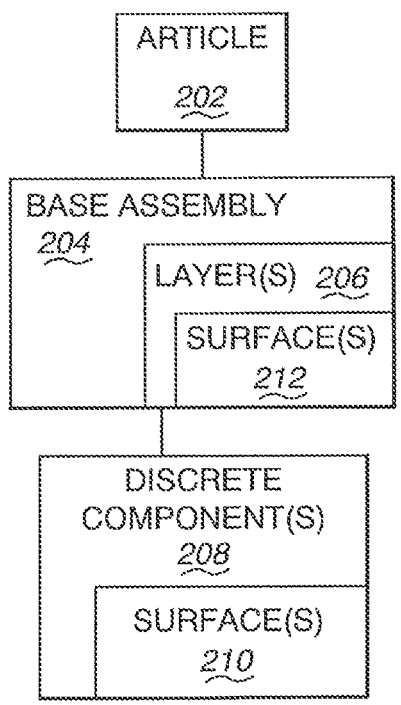
FIG. 33 is a schematic representation of another form of adornment assembly, according to the present invention, and integrated into an article.

A further form of the invention is shown in schematic form in FIG. 33. An adornment assembly 200 is designed for use on, or to be incorporated into, an article 202, that may be virtually any item on which adornment is provided, including but not limited to, apparel, such as headwear, and other articles identified above.

The adornment assembly 200 consists of a base assembly 204 that in turn consists of at least one layer 206, with any number of such layers 206 contemplated.

A plurality of discrete components 208 are incorporated into/applied to the base assembly 204 so that exposed surfaces 210 thereon can be viewed together with one or more exposed surface 212 on the layer(s) 206.

The surfaces 210, 212 may have a significant areal extent or may appear as a sharp line, dot, or other discrete shape.

It should be emphasized that the adornment assembly 200 may incorporate any of the concepts for the adornment assemblies 10, 110, described above, and other concepts associated with variations as further described below. The schematic showing in FIG. 33 is intended to encompass all specific forms herein as well as variations thereof, which includes variations of the individual components and their combination.

The layers 206 may be made from a multitude of different materials. While fabric or cloth, produced by uniting textile fibers through weaving, knitting, or the like, is preferred, the invention contemplates using other materials such as leather, plastic, composites, etc. "Scintillating" fabrics have proven particularly desirable because of their interesting textures and wide range of different available visually appealing patterns.

Figure 34:
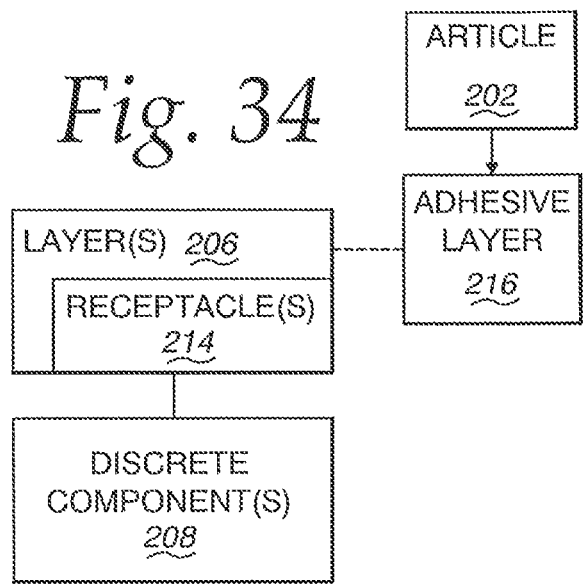
FIG. 34 is a schematic representation of the adornment assembly and article in FIG. 33, and showing additional detail of the adornment assembly.

As shown in FIG. 34, at least one of the layers 206 defines at least one receptacle 214 for accommodating the discrete components 208. A single receptacle 214 may be formed partially or fully through one of the layers 206. Alternatively, the receptacle may extend into multiple layers 206.

With the plurality of discrete components 208 placed in the receptacle(s) 214, the surfaces 210 and surface(s) 212 are simultaneously exposed for viewing with the adornment assembly 200 secured to the article 202.

The adornment assembly 200 can be preassembled or assembled in situ on the article 202. Surfaces on the discrete components 208 facing oppositely to the surfaces 210 typically will abut to one of the layers 206, an adhesive layer 216, optionally used to secure the base assembly layers 206 to the article 202 or each other and which may be considered to make up one of the layers 206, or the article 202 itself.

The projection of the surfaces 210 is determined by the thicknesses of the discrete components 208 in relationship to the depth of the receptacle(s) 214. In a preferred form, this relationship is such that the surfaces 210 on the discrete components 208 and surface(s) 212 on the base assembly 204 are flush so as to define a substantially smooth surface that, if desired, can simulate a continuous pattern, but potentially with greater detail made possible.

Alternatively, the surfaces 210 might project beyond the surface(s) 212 or be recessed therefrom. The combination of a projecting and recessed arrangement is also contemplated.

The thicknesses of all of the layers 206, 216 and discrete components 208 are generally selected based upon the overall look that is desired. For example, an adornment assembly that is applied on the front crown region of a baseball-style cap is typically made with a low profile. However, it may be desired to produce greater bulk and to highlight the peripheral edge of the adornment assembly 200.

Heretofore, adornment assemblies of higher quality have been made using long-known woven embroidery techniques. While contrasting regions and designs can be made to give the appearance of sharp transitions between contrasting materials, colors, etc., on a relatively small scale, weaving and embroidering have limitations.

It has been discovered that precise and sharp transitions between contrasting design regions can be effectively accomplished, while still producing a smooth surface, by using the above-described construction shown schematically in FIGS. 33 and 34. This is true even for designs that are small enough to be circumscribed by a circle on the order of one inch or less. For example, the adornment assembly 200 may be made practically with a circumscribing diameter of approximately ½ inch or less.

While other techniques make the formation of small discrete components 208 possible, it has been found unexpectedly that laser cutting of fabrics (made from knitted and woven threads or yarns—herein collectively "woven fabrics") and other materials is capable of producing sharply defined discrete components 208 with a very small size that can be placed in the receptacles 214.

One significant aspect of the invention is that the layers 206 around the receptacles 214 cooperate with the discrete components 208, and potentially the discrete components 208 cooperate with each other, to establish and maintain relationships between components and minimize component shifting and distortion, to allow intricate designs to be created through the placement of the discrete components 208 in the receptacles 214.

Figure 35:
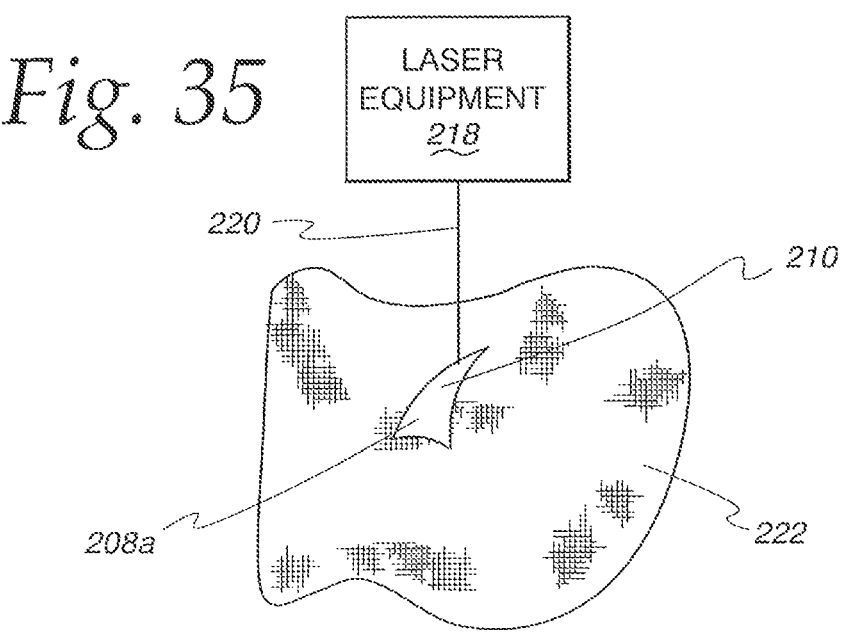
FIG. 35 is a front elevation view of a discrete component on the adornment assembly, as shown in FIGS. 33 and 34, being laser cut from a sheet.

An initial construction will be described with respect to FIGS. 35-38. As shown in FIG. 35, currently available $CO_2$ laser equipment 218 is utilized to produce a cutting beam 220 that can be used to trace the outline of a discrete component 208a, which can then be separated from a stock sheet 222. As noted above, the sheet 222 can take virtually an unlimited number of forms, such as a woven fabric, which will be described for this embodiment. As seen, the fabric discrete component 208a has generally a tooth shape with a thickness TH between oppositely facing surfaces 210, 228. While the thickness TH is uniform, this is not a requirement.

In this embodiment, the adornment assembly 200 has a base assembly 204 made up of a single layer 206 that is secured to the article 202 through the adhesive layer 216.

The layer 206 may be laser cut or otherwise cut or formed to produce the receptacle 214. The receptacle 214 has a depth DE substantially equal to the thickness TH, whereby with the discrete component 208a placed in the receptacle, the surface 228, facing the article surface 230 to which the adornment assembly 200 is attached, abuts to the adhesive layer 216 in a manner whereby the surface 210 is substantially flush with the surface 212 on the layer 206.

In this embodiment, a portion of the perimeter edge 232a of the discrete component 208a nests within a complementarily-shaped portion of a perimeter edge 232b on the discrete component 208b. By laser cutting the discrete components 208a, 208b, the perimeter shapes can be precisely matched so that there is a sharp and crisp transition between the discrete components 208a, 208b, which contrast can be utilized to produce the desired design look.

The surrounding edge 234 bounding the receptacle 214 is closely matched to the perimeter shape of the combined discrete components 208a, 208b.

With this construction, the perimeter and surrounding edges 232a, 232b, 234 abut and cooperate to maintain a predetermined relationship between the discrete components 208a, 208b with each other and with the base assembly layer 206.

While in all constructions this relationship of parts is preferred, it is particularly significant in constructions wherein the adhesive layer 216, or another type of adhesive structure, is heated to bond the adornment assembly 200 to the article surface 230 or another intermediate layer. The interacting edges 232a, 232b, 234 align, and prevent relative shifting between, the discrete components 208a, 208b and base assembly layer 206 and further minimize deformation of components that would otherwise detrimentally occur as the adhesive layer 216 is elevated to the temperature necessary to cause it to bond. This is particularly important when the discrete components 208 are thin and flexible, and potentially very small. Intricate designs may be made using a collection of potentially many of the discrete components 208 that are pressed into interacting relationship with each other and the base assembly 204. Because the transition edges are defined by different components, a crisp transition can be maintained, whereas with an embroidered construction this transition is, at least on a magnified scale, blurred by reason of the intermeshing of fibers of different construction, color, etc.

It is significant to note that the edges 232, 234 do not have to be precisely matched along their entire peripheral extent. For example, in one form, with the surrounding edge 234 framing the discrete components 208, there might be gaps or a slight mismatch between the edges 232, 234. However, significant enough interaction should be effected so that the discrete components 208 consistently align with each other and the receptacles 214 and there is a mutual reinforcement between the components so that they maintain shape and do not shift, particularly when they are heated as an incident of activating a heat responsive adhesive. In the depicted form, the peripheral edges 232a, 232b and base layer edge 234 are in full conformity, with the edge 234 defining a confining "frame".

In a further alternative construction, as shown in FIG. 39, the layer 206' has a receptacle 214' formed so that the edge 234' bounding the receptacle 214' conforms closely, or extends around, only a portion of the combined perimeter extent of the edges 232a', 232b' of the discrete components 208a', 208b'. That is, the surrounding edge 234' only partially surrounds the combined extent of the perimeter edges 232a', 232b'. However, the surrounding edge 234' preferably still cooperates with the perimeter edges 232a', 232b' in a manner to maintain the relationship between the discrete parts 208a', 208b' in the layer 206'.

Whereas in FIG. 37, the perimeter edges 232a, 232b abut to each other or the surrounding edge 234 over their full combined perimeter extent, in FIG. 39, a portion of the perimeter edges 232a', 232b' remains exposed at the perimeter edge 236 of the layer 206'. It is not a requirement that the unabutted edge portions 238a', 238b' match the shape of the perimeter edge 236 of the layer 206', as depicted.

With the use of flexible material, such as fabrics, the perimeter edges 232 and surrounding edge 234 can be pressed tightly against each other in a potentially slightly compressed state for the material making up the discrete components 208 and/or layer 206. Part or all of the edges 232, 234 can be simply in close proximity and/or there can be discrete gaps. As noted above, conformity over the entire extent of the edges 232, 234 is not a requirement, with it being preferred that at least enough contact be made that predetermined alignment of the layer 206 and discrete components 208 is maintained and reinforcement between the edges 232, 234 occurs so that components do not appreciably deform or shift relative to each other.

Figure 40:
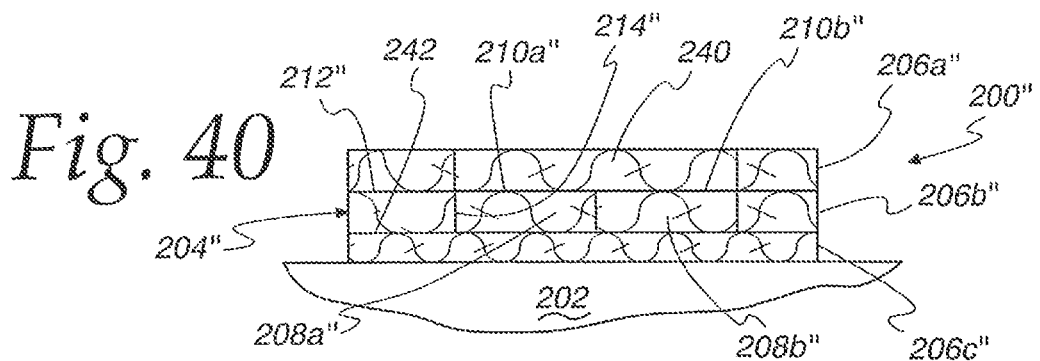
FIG. 40 is a cross-sectional view of a further modified form of adornment assembly, as shown schematically in FIGS. 33 and 34.

In FIG. 40, a further modified form of adornment assembly is shown at 200". The adornment assembly consists of a base assembly 204" with three layers 206a", 206b", 206c", with the layer 206c secured by stitching, adhesive, etc. (not shown) to the article 202, or itself made up of an adhesive.

The receptacle 214" is formed in the layer 206b" to accept discrete components 208a", 208b".

In this embodiment, the layer 206a" defines a masking area 240 through which the underlying components 208a", 208b" can be viewed. Masking is a known technique that allows the viewable image to be a combination of the masking component and the underlying surface.

In this embodiment, the discrete components 208a", 208b" have the same thickness as the layer 206b" and abut to a surface 242 on the layer 206c" to maintain a flush relationship between the surfaces 210a", 210b" and the surface 212" on the layer 206b".

The stacked and interengaged components in each of the adornment assemblies 200, 200', 200" can be joined to each other or other components conventionally, as by stitching, adhesive, or otherwise by techniques known to those skilled in this art. As just one example, the layer 206b" and discrete components 208a", 208b" may be secured to the layer 206c" as through adhesive and/or stitching, etc.

In this and other embodiments, the discrete components 208 may extend one of: a) through a plurality of layers 206 on the base assembly 204; b) partially through a layer 206 on the base assembly 204; and c) fully through a single layer 206 on the base assembly 204.

While the embodiments disclosed in FIGS. 33-40 have been described using multiple discrete components 208, it is possible that a single discrete component 208 might be incorporated in like manner.

With the described construction, it is possible to make intricate designs by combining the discrete components 208 and layers 206 as in a mosaic-type arrangement. For example, as shown in the earlier embodiment in FIG. 26, the discrete component 108', shown in the shape of the head of a Native American with traditional headdress, might be made with multiple discrete components 208, identified as A-P, each being a flexible thickness of material. As with all embodiments herein, the discrete components A-P, and accommodating receptacles 214, may be shaped and dimensioned so that the flexible layers of the discrete components A-P, when press fit, are tightly held. This is possible by making one, or both, of the discrete components A-P and layer(s) 206 slightly compressible whereby the discrete components A-P are held in place with a slight squeezing force.

A pressure sensitive adhesive may be provided on the discrete components to enhance a holding force within a receptacle. The adhesive may hold with greater tenacity when heated or may be unaffected by temperature. The pressure sensitive adhesive may have a backing layer, such as from Mylar, that can be peeled by an assembler. The pressure sensitive adhesive may be applied over a separate adhesive layer or directly to a non-adhesive component. This construction permits a sharp contrast between each of the pieces that allows contrasting detail to be highlighted. Of course, some of the discrete components A-P might be combined. For example, discrete components A and B might be a single piece.

Great versatility is thus afforded to create intricate designs for logos, pictures, scenes, etc.

While reference above has been made to adornment assemblies that are relatively small, the same concepts can be used to form larger adornment assemblies. For example, as shown in FIG. 41, an adornment assembly 200''' is shown of the type that might be applied to a team uniform.

Figure 42:
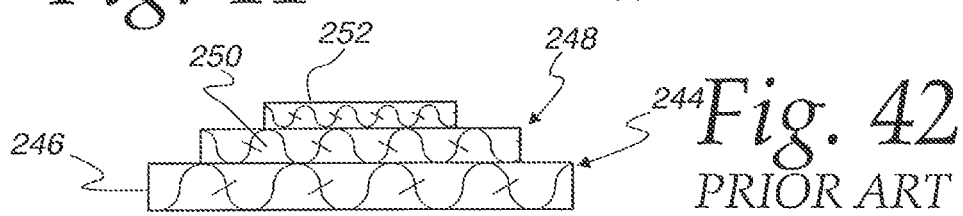
FIG. 42 is a side elevation view of a conventional adornment assembly.

As shown in FIG. 42, conventionally team appliqués, corresponding to the adornment assembly 200'', as shown at 244, may be used to identify a team name, a player number, player name, etc. The appliqué consists of a substrate layer 246 to which individual letters or numbers 248 are suitably secured. The letters/numbers 248 may be stacked layers 250, 252 made with contrasting materials. As depicted in FIG. 42, there are thus three stacked layers that end up producing a bulky structure that projects from the particular apparel item. Aside from the unwanted bulk, the stacked construction produces edges that are potentially capable of being snagged in use.

Figure 41:
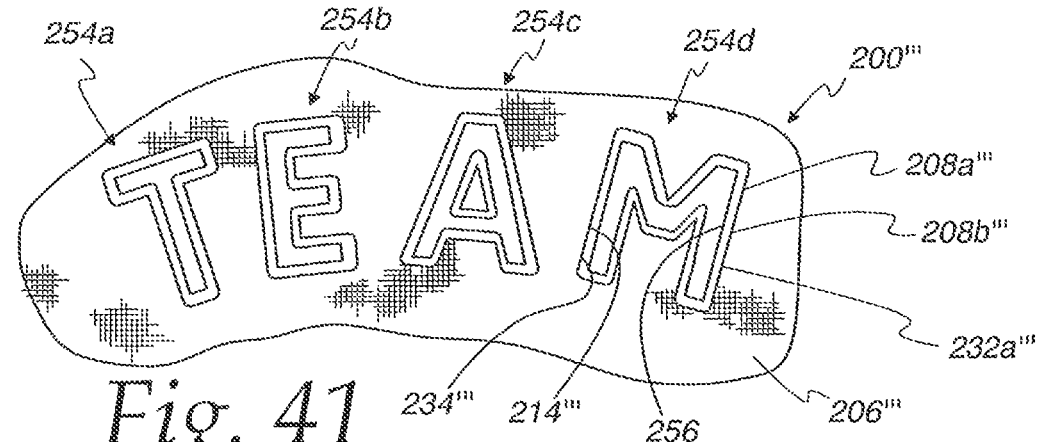
FIG. 41 is a front elevation view of another form of adornment assembly, as shown schematically in FIGS. 33 and 34.

In FIG. 41, the individual letters 254a, 254b, 254c, 254d are made according to the invention potentially with a single layer corresponding to the construction shown in FIG. 38. That is, the letter "M" is made of two discrete components 208a''', 208b''' with the latter fitting in a complementary-shaped receptacle 256 in the former. The substrate layer 206''' defines a receptacle 214''' with a surrounding edge 234''' matched to the perimeter edge 232a''' of the discrete component 208e. The components may be formed so that there is a flush exposed surface, though flush is not a requirement.

The combination of materials making up the discrete components 208 and layers 206 is substantially limitless. As just examples, the discrete components and layers 206 that are exposed may both be woven fabric. The discrete components 208 might be a woven fabric and placed in a felt material. Depending upon the desired overall thickness of the adornment assembly, thinner or thicker materials may be used. Thin, highly flexible fabrics, as used to conventionally form apparel items such as shirts, skirts, pants, etc., are suitable as are thicker, less flexible materials that may be used for the layers 206 and/or the discrete components 208.

With both the layers 206 and discrete components 208 made from a thin material, such as woven fabric, intricate designs are possible with a thin profile.

Fabrics with a poly, construction (polyester or synthetic) lend themselves to precision cutting, as with a laser, without unwanted fraying, discoloration, and/or distortion. With known $CO_2$ laser technology, discrete components 208 can be made with a controlled shape even though one or more transverse dimensions may not be much larger than the thickness of a conventional push pin.

A woven discrete component with a pre-formed design, made using embroidery, including fine thread embroidery, might also be placed in a receptacle 214 using the same techniques.

The invention contemplates many variations using the basic concepts described herein. For example, the adornment assembly 200 may be made using a combination of one or more of recessing, masking, and layering techniques.

One or more discrete components 208 may each be made up of one or more layers that are partially or fully overlapped, with the latter typically involving incorporation of a masking area.

Figure 43:
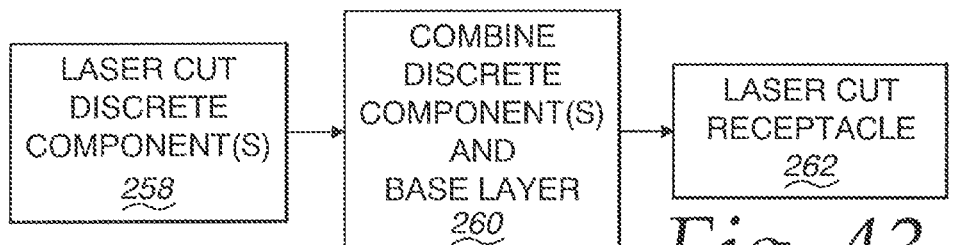
FIG. 43 is a flow diagram representation of a method of forming an adornment assembly, according to the invention.

The invention also contemplates a method of forming adornment assemblies as described above. As shown in flow diagram form in FIG. 43, a sheet layer is laser cut to thereby form at least a part of the peripheral edge of a first of the discrete components, as shown at block 258.

As shown at block 260, the first discrete component is combined with a second discrete component, that may be laser cut or otherwise formed, and the base layer so that at least one of the second discrete component and base layer conforms closely to the part of the peripheral edge of the first discrete component.

As shown at block 262, the receptacle in the base assembly is formed, as through a laser cutting operation. Laser cutting is not required.

Figure 44:
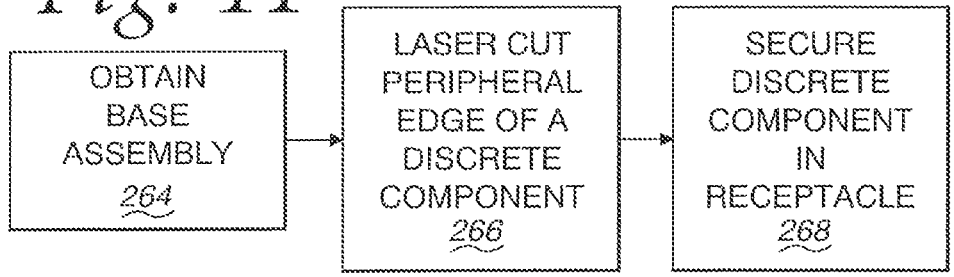
FIG. 44 is a flow diagram representation of another method of forming an adornment assembly, according to the present invention.

In FIG. 44, an alternative method of forming an adornment assembly, according to the invention, is shown in flow diagram form.

As shown at block 264, a base assembly is obtained having at least one layer, each with a thickness between oppositely facing surfaces. One of the oppositely facing surfaces on the at least one layer is configured to face an article surface to which the adornment assembly is secured. The at least one layer defines at least a first receptacle.

As shown at block 266, a sheet layer is laser cut to thereby form at least a part of a peripheral edge of a discrete component.

As shown at block 268, the discrete component is secured in the receptacle so that the base assembly conforms closely to the part of the peripheral edge of the discrete component. Laser cutting is not required.

The base assembly may be laser cut to form the edge around the receptacle that closely conforms to at least a portion of the part of the peripheral edge of the discrete component.

It should be understood that the above embodiments are exemplary in nature only. The basic elements in each of the variations might be used in different combinations to open up a virtually unlimited potential for creating visually appealing ornamentation.

The foregoing disclosure of specific embodiments is intended to be illustrative of the broad concepts comprehended by the invention.

The invention claimed is:

1. In combination:
   a) an apparel article with an exposed surface; and
   b) an adornment assembly secured to the apparel article at the exposed surface, the adornment assembly comprising:
   a base assembly comprising at least one layer, with each of the at least one layer having a thickness between oppositely facing surfaces,
   one of the oppositely facing surfaces on one or more of the at least one layer configured to face the exposed apparel article surface at which the adornment assembly is secured,
   the at least one layer defining at least a first receptacle with a surrounding edge; and
   a plurality of discrete components each made from a flexible and compressible material and each having a thickness between oppositely facing component surfaces and a peripheral edge,
   the plurality of discrete components comprising at least first and second discrete components that are placed in the first receptacle with the first discrete component compressed so that the peripheral edge of the first discrete component is urged against at least one of the surrounding edge and the peripheral edge of the second discrete component and so that one of the oppositely facing component surfaces on each of the first and second discrete components is exposed for viewing together with the exposed surface of the apparel article.

2. The combination according to claim 1 wherein the peripheral edges of the first and second discrete components and surrounding edge abut to maintain a predetermined alignment of the first and second discrete components and one or more of the at least one layer.

3. The combination according to claim 1 wherein at least one of the oppositely facing surfaces on at least a first of the at least one layer is exposed for viewing together with the one of the oppositely facing component surfaces on each of the first and second discrete components.

4. The combination according to claim 3 wherein the at least one of the oppositely facing surfaces on the first layer is substantially flush with the one of the oppositely facing component surfaces on the first and second discrete components.

5. The combination according to claim 2 wherein a full extent of the peripheral edge on the first discrete component is abutted, or in close proximity, to at least one of: a) the surrounding edge of the first receptacle; and b) at least one peripheral edge on at least another one of the plurality of discrete components.

6. The combination according to claim 3 wherein the at least one layer consists of only the first layer.

7. The combination according to claim 1 wherein the at least one layer comprises a first layer and a second layer with oppositely facing surfaces between the first layer and the apparel article.

8. The combination according to claim 2 wherein the peripheral edge on the first discrete component has only a portion that is surrounded by one or more of the at least one layer and/or another one or more of the plurality of discrete components.

9. The combination according to claim 5 wherein a full extent of the peripheral edge on the first discrete component is closely conformingly surrounded by the surrounding edge of the first receptacle and the at least one peripheral edge on at least another of the at least one of the plurality of discrete components.

10. The combination according to claim 8 wherein the portion of the peripheral edge on the first discrete component is closely conformingly surrounded by one or more of the at least one layer and/or at least another of the plurality of discrete components.

11. The combination according to claim 7 wherein one of the oppositely facing surfaces on the second layer is directly exposed to the apparel article and the other of the oppositely facing surfaces on the second layer is directly exposed to the one of the oppositely facing surfaces on the first layer.

12. The combination according to claim 1 wherein the at least one layer and the plurality of discrete components each is made from a flexible fabric.

13. The combination according to claim 1 wherein one of the at least one layer is configured to define a masking area through which an underlying component can be viewed.

14. The combination according to claim 12 wherein the flexible fabric has a woven construction.

15. The combination according to claim 1 wherein the apparel article is a headwear piece.

16. The combination according to claim 1 wherein the oppositely facing component surfaces exposed for viewing on each of the first and second discrete components cooperate to define at least a part of a logo.

17. The combination according to claim 1 wherein the adornment assembly further comprises an adhesive layer that is heated to secure the plurality of discrete components to at least one of the apparel article and the base assembly.

18. The combination according to claim 1 wherein the first receptacle extends one of: a) through a plurality of the layers making up the at least one layer on the base assembly; b) partially through one of the layers making up the at least one layer on the base assembly; and c) fully through a single one of the layers making up the at least one layer on the base assembly.

19. The combination according to claim 1 wherein the base assembly and first discrete component are configured so that the first discrete component is maintained in a predetermined position within the first receptacle.

20. A method of forming the adornment assembly of claim 2, the method comprising the steps of:
    laser cutting a single sheet layer to thereby form at least a part of the peripheral edge of the first discrete component; and
    combining the first discrete component as a single sheet layer with the second discrete component and the base layer so that at least one of the second discrete component and base layer conforms closely to the part of the peripheral edge of the first discrete component.

21. The method of forming the adornment layer of claim 20 further comprising the step of forming at least a part of the first receptacle in the base assembly through a laser cutting operation.

22. A method of forming the adornment assembly of claim 1, the method comprising the steps of:
    laser cutting a single sheet layer to thereby form at least a part of a peripheral edge of the first discrete component; and
    securing the first discrete component as a single sheet layer in the first receptacle so that the base assembly conforms to the part of the peripheral edge of the first discrete component.

23. The method of forming an adornment assembly according to claim 22 further including the step of laser cutting the base assembly to form an edge around the first receptacle that closely conforms to at least a portion of the part of the peripheral edge of the first discrete component.

24. The method of forming an adornment assembly according to claim 23 wherein the first discrete component comprises a fabric that is woven.

25. The method of forming an adornment assembly according to claim 24 wherein the one or more of the at least one layer comprises a fabric.

26. The method of forming an adornment assembly according to claim 25 wherein the fabric of the one or more of the at least one layer comprises a woven fabric.

27. The method of forming an adornment assembly according to claim 22 wherein the step of securing the first discrete component comprises securing the first discrete component using a heat activated adhesive.

28. In combination:
    a) an apparel article with an exposed surface; and
    b) an adornment assembly secured to the apparel article at the exposed surface, the adornment assembly comprising:
    a base assembly comprising at least one layer, with each of the at least one layer having a thickness between oppositely facing surfaces,
    one of the oppositely facing surfaces on one or more of the at least one layer configured to face the exposed surface to which the adornment assembly is secured, the at least one layer defining at least a first receptacle; and a plurality of discrete components each having a thickness between oppositely facing component surfaces, the plurality of discrete components comprising at least first and second discrete components that are placed in the first receptacle so that one of the oppositely facing component surfaces on each of the first and second discrete components is exposed for viewing, wherein the first and second discrete components each has a peripheral edge and the first receptacle has a surrounding edge, the peripheral edges on the first and second discrete components and surrounding edge abutted to maintain a predetermined alignment of the first and second discrete components and the one layer, wherein the first and second discrete components are each made from a flexible and compressible material, wherein the peripheral edges of the first and second discrete components are compressed against each other.

29. The combination according to claim 28 wherein the first and second discrete components are made from fabric.

* * * * *